United States Patent [19]
Haas

[11] Patent Number: 5,485,298
[45] Date of Patent: Jan. 16, 1996

[54] OPTICAL PACKET SYNCHRONIZATION CIRCUIT

[75] Inventor: Zygmunt Haas, Holmdel, N.J.

[73] Assignee: AT&T Corp., Murray Hill, N.J.

[21] Appl. No.: 400,402

[22] Filed: Mar. 7, 1995

Related U.S. Application Data

[63] Continuation of Ser. No. 89,068, Jul. 7, 1993, abandoned.

[51] Int. Cl.[6] .................................................. H04J 14/08
[52] U.S. Cl. ...................... 359/139; 359/140; 370/108
[58] Field of Search ................................. 359/135, 137, 359/139, 140; 370/108, 118

[56] References Cited

U.S. PATENT DOCUMENTS

| | | | |
|---|---|---|---|
| 5,107,361 | 4/1992 | Kneidinger et al. | 359/135 |
| 5,115,428 | 5/1992 | Ramanan et al. | 359/140 |

FOREIGN PATENT DOCUMENTS

| | | | |
|---|---|---|---|
| 60-47588 | 3/1985 | Japan | H04B 9/00 |
| 8605343 | 9/1989 | United Kingdom | 359/140 |

OTHER PUBLICATIONS

Z. Haas, "'Staggering Switch': An 'Almost–All' Optical Packet Switch," Electronics Letters, vol. 28, No. 17, Aug. 13, 1992, pp. 1576–1577.
GEC–Marconi Techbrief, Digital Optical Switch, 1989.
Ericsson–"High speed LiNbO$_3$ External Modulators," 1990.

Primary Examiner—Leo H. Boudreau
Assistant Examiner—Rafael Bacares

[57] ABSTRACT

A packet synchronization technique, in a synchronous optical packet switch, which delays received packets to ensure that there is only one packet per local time slot. The packets are of a time duration τ which is equal to or less than one-half the duration of the local time slot of the optical switch. Each packet received at an optical switch is delayed an interval of nτ where n=0, 1 or 2.

9 Claims, 4 Drawing Sheets

CASE NR.1

CASE NR.2

OPTICAL PACKET SYNCHRONIZATION CIRCUIT

This is a continuation, of application Ser. No. 08/089,068 filed on Jul. 7, 1993 now abandoned.

FIELD OF THE INVENTION

This invention relates to optical packet switched data/ voice communication systems. In particular, it is directed to a method and apparatus to continuously synchronize the packet arrival times at the inputs of a synchronously operated optical packet switch with local time slots.

BACKGROUND OF THE INVENTION

In wide area communication networks, because of the relatively large uncertainty and considerable changes in the optical signal propagation delay, the packet arrival times must be continuously synchronized at the inputs of a synchronously-operated packet switch. One example of such an optical switch is described in IEE Electronic Letters, 13th August 1992 and is titled '*Staggering Switch': An Almost-all Optical Packet Switch*, by Z. Haas, which is incorporated by reference herein.

Previously proposed schemes to provide such packet synchronization rely on a plurality of delay devices located at the input to the optical packet switch. Each device provides a delay which is a fractional part of a packet transmission time, so that substantially any value of required delay may be generated to compensate for the difference between the packet arrival time and the beginning of a local time slot in the switch. Such delay devices are typically fabricated Using fiber delay lines in combination with 2×2 Lithium Niobate optical modules such as Type Y-35- 8771 manufactured by the GEC-Marcone Company of Baddow Chelmsford, Essex England.

The problem with the above synchronization scheme is the resulting relatively large power penalty incurred due to the multiple coupling loss between the optical modules and the optical fiber delay lines(i.e., the optical signal travels several times in and out of the Lithium Niobate wafers.)

Accordingly, there is a need for a technique to continuously synchronize the optical packet arrival times with the local time slots of a synchronously operated optical packet switch and that results in a minimum power penalty and cost.

SUMMARY OF THE INVENTION

The instant invention overcomes the foregoing problem by receiving a stream of packets, each having a time duration of τ, which is equal to or less than half the duration of the local time slot of the optical packet switch; determining any packet delays required to adjust the incoming packet stream to a single packet per local time slot; and delaying selected packets to form a packet stream having one packet per local time slot based upon the delays established by the determining step.

Additionally, each packet is delayed nτ where n=0,1 or 2 based upon the determining step.

The instant scheme provides packet synchronization while reducing the power penalty associated with prior techniques.

DETAILED DESCRIPTION

Figure 1:
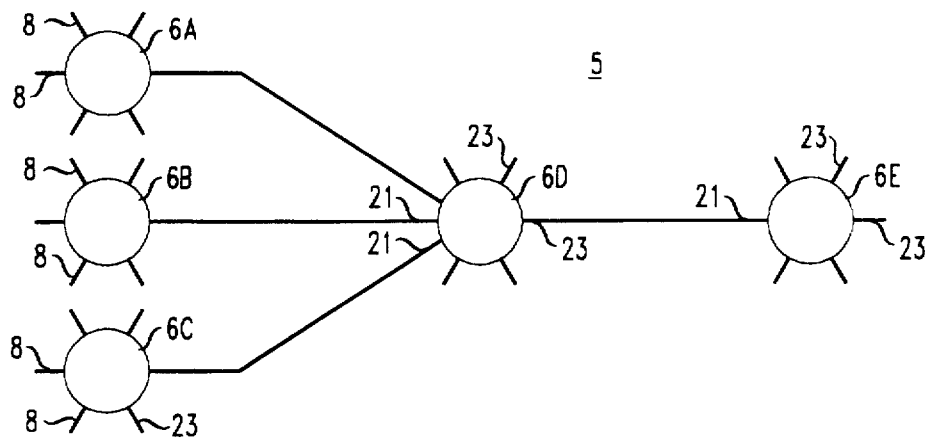
FIG. 1 depicts a simple optical transmission network.

FIG. 1 is a general view of a portion of an optical packet switched network generally indicated by the numeral 5. The network 5 is comprised of a plurality of optical nodes or packet switches 6a to 6e. End users are connected to the network 5 via lines 8.

Figure 2:
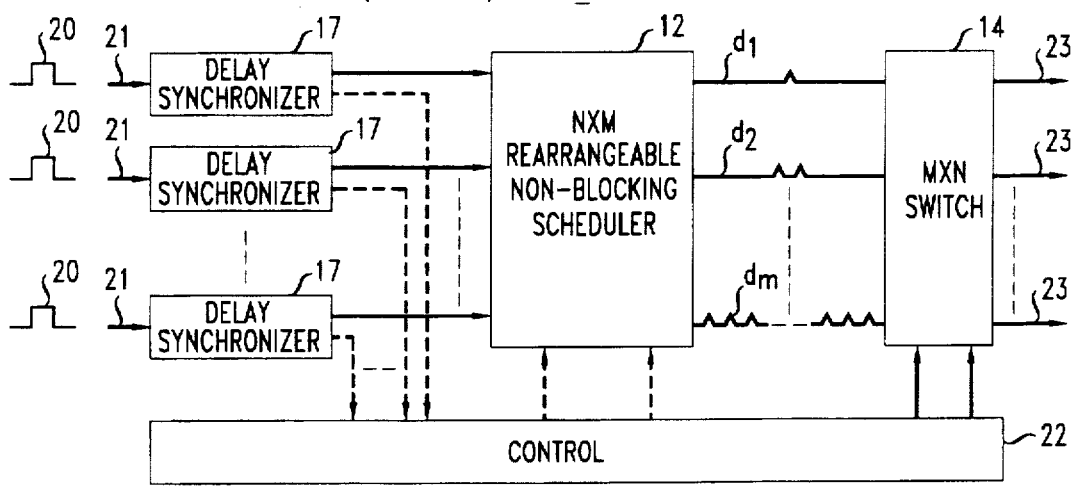
FIG. 2 shows an example of an optical switch architecture.

An exemplary synchronous optical packet switch 6 is shown in FIG. 2. The switch 6 is comprised of two stages: the scheduling stage 12, and the switching stage 14. Each one of the stages 12 and 14 is a reconfigurably, non-blocking switching fabric design. The scheduling stage 12 is an n×m switch and the switching stage 14 is an m×n, where m≧n. The scheduling stage 12 is connected to the switching stage 14 by m delay lines $d_i$, where i=1 to m. The delay of the delay line $d_i$ equals i packets in time duration. A plurality of delay synchronizers 17 are located at the front end of the switch 6, to receive the packets 20 to be synchronized and switched to appropriate outputs 23. An electronic control apparatus 22 is electrically connected to the delay synchronizers 17 as well as the scheduling and switching stages 12 and 14. The dashed lines represent an electrical connection while the solid lines are optical connections.

Figure 3:
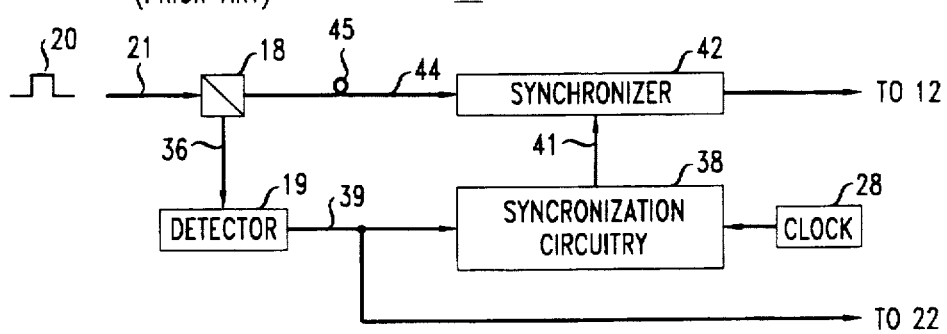
FIG. 3 shows a block diagram of a delay synchronizer used to implement the instant invention.

The delay synchronizer 17, shown in detail in FIG. 3, is comprised of an optical splitter 18, which receives a stream of packets 20, and has a first output 36, optically connected to a detector 19. The detector 19, is electrically connected to synchronization circuitry 38 via output connection 39, and to the electronic control apparatus 22 (see FIG. 2). The synchronization circuitry 38 is electrically connected to a synchronizer 42 via connection 41. A second output 4=4 from the splitter 18 is optically connected to the synchronizer 42 via a delay circuit 45. The output of synchronizer 42 is connected to the scheduling stage 12 (FIG. 2). A local clock 28 provides timing pulses to the synchronization circuitry 38.

In operation, the energy of the packets 20, on each one of the input lines 21 to the delay synchronizer 17 of the switch 6 is optically split immediately after arrival by the splitter 18 (FIG. 3). A "small" fraction of the optical energy is passed to the detector 19, converted to an electrical signal and forwarded to the electronic control apparatus 22 (FIG. 2) and the synchronization circuitry 38. The remainder of the optical energy, representing packet 20, passes from the splitter 18 to the synchronizer 42 via delay circuit 45. The delay time provided by circuit 45 compensates for the delay in the optical energy passing through the detector 19 and the synchronization circuitry 38. The control apparatus 22, reads the header bits in the packet 20, to determine the required routing for the packet. The control apparatus 22, then drives the scheduling stage 12, and the switching stage 14, to switch the incoming packet 20, to an appropriate output 23. The synchronizer circuitry 38 processes the information from the detector 19 to control the synchronizer 42 to provide the appropriate delays to the received packets 20 so that they are synchronized with the local time slots of the switch 6.

When the switch 6 is used as a part of an alloptical network 5, it is either necessary to ensure that all inputs to the switch are synchronized (i.e. that packets 20, arriving at different switch inputs 21 are aligned at the switch) or to operate the switch in an unsynchronized manner. If the switch 6, is to be unsynchronously operated, the scheduling and switching stages 12 and 14, respectively, should be non-blocking elements (i.e. as opposed to reconfigurably non-blocking elements) in the synchronized case. Otherwise, there is an additional penalty due to the blocking in the scheduling stage 12, and the switching stage 14. Undesirably, non-blocking stages with minimal cross-talk are difficult and very expensive to manufacture.

Figure 4:
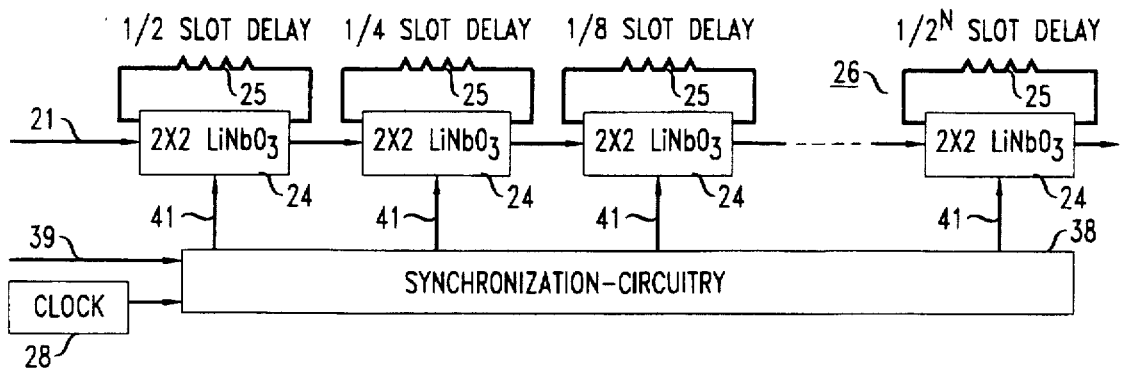
FIG. 4 shows a prior art scheme for packet synchronization.

When the switch 6, operates synchronously, a known technique as shown in FIG. 4 may be used to synchronize a stream of packets 20, arriving at the inputs 21. Each packet 20 has a time duration equal to the local time slot of the switch 6. A plurality of 2×2 Lithium Niobate modules 24, with delay elements 25, form a delay circuit 26 which are connected in tandem to form a delay line 27. Each delay element 25 has a delay equal to a fractional portion of a packet time slot. The synchronization circuitry 38, determines the packet 20 arrival time based on the information from the detector 19,(see FIG. 2) and slot information from the local clock 28. The synchronization circuit 38, after comparing the arrival time of the packet 20, with the phase of the local slot clock 28, generates the appropriate setting for the modules 24, to switch-in or bypass the delay elements 25, so that the input stream of packets 20 passing through the delay line are aligned with the local clock 28. It can be seen that each delay element 25 may be switched into the delay line 27 or bypassed based upon control signals from the synchronization circuit 38. If the delay variations in the network 5 are slow, the adjustments to the delay line 27 will be infrequent.

Undesirably, such a technique suffers relatively high attenuation caused by the multiple traverses of the optical signal traveling through the Lithium Niobate wafers which form a part of each 2×2 module 24. Such losses require the use of additional optical repeaters/amplifiers in the transmission lines to maintain required signal levels. Such repeaters/amplifiers are expensive and may require periodic maintenance, repair and replacement.

The instant invention overcomes the foregoing problems with a novel synchronization scheme termed "packet flipping". Packet flipping (i.e. delaying) uses packet time slots that are twice the length of the time duration of the packet 20. Prior art packet switching systems have packet time durations that are substantially the same as their allotted time slots. Therefore, with the instant technique, there will be a penalty of a 50% reduction in network capacity. However, this is in line with the philosophy that some part of the enormous optical bandwidth may be "wasted" to provide simpler control or operation of the all-optical network.

Figure 5:
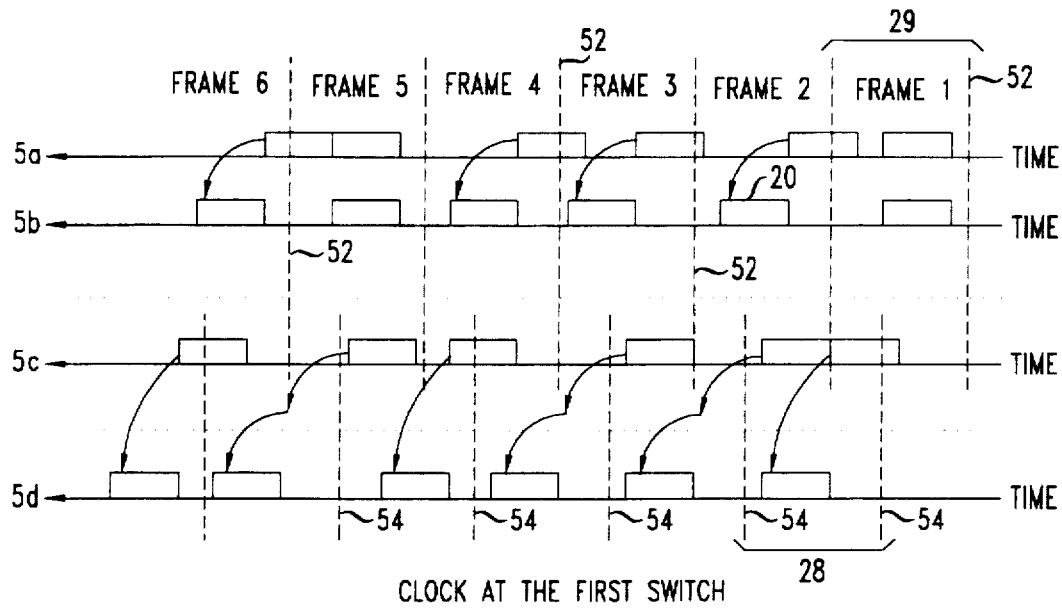
FIG. 5a to 5d show trains of packets at various points in the optical transmission network according to the invention.
Figure 6:
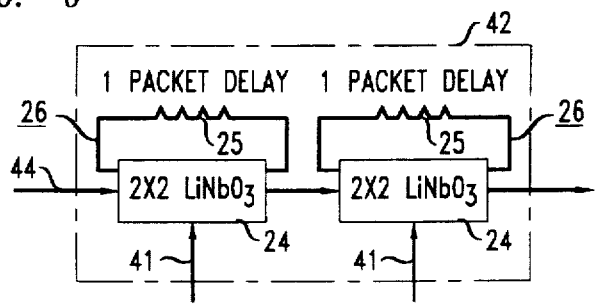
FIGS. 6 and 7 show the details of exemplary synchronizers used to implement the invention.

This technique also requires that the local clock 28 of each switch 6 in the network 5 has a period of $2\tau$, where $\tau$ is the time duration of the packet 20. A $2\tau$-long time slot is referred, to as a frame 29 as shown in FIG. 5a. The clocks at different switches 6a to 6e are unsynchronized with each other. Additionally, an optical signal with packets 20 positioned between the clock ticks 52 20, is called an s-characteristic signal (i.e. only one packet per frame 29.) If such traffic is presented to a first switch 6d, for example, with a slot duration equal to the frame 29 duration (i.e. twice the duration of the optical packet), the switch 6 will preserve the s-characteristic. However, if this traffic coming from the output of switch 6d, is received at the input of a second switch 6e local frame clock which is unsynchronized with the clock at 6d, the s-characteristic may be violated, as shown in FIG. 5a. To correct this violation, and provide a single packet 20 per frame 29 aligned With the local clock 28 of the switch 6a to 6e, the synchronizer 42 as shown in FIG. 6, is used.

The instant synchronizer 42, in an exemplary embodiment is comprised of two serially connected delay circuits 26. Each delay circuit 26 has a 2×2 Lithium Niobate module 24 and an associated delay element 25. Each delay element 25 (e.g. optical fiber) provides a delay equal to the time duration of one packet (i.e. $\tau$). The serial combination of the two delay circuits 26 provides three paths for packets 20 to pass through the synchronizer 42. Each delay circuit 26 can either add no extra delay or a delay of $\tau$ to the received optical signal. Accordingly, the serial combination of the two delay circuits 26, in the synchronizer 42, can provide (1) no delay, (2) $\tau$ delay or (3) $2\tau$ delay under the control of the synchronization circuitry 38 over the connections 41. Therefore, if a packet 20 does not fall between two frame clock ticks 52 or if there are two packets per frame 28, an appropriate delay is provided by the synchronizer 42 to restore the characteristic using only two delay circuits 26.

Figure 7:
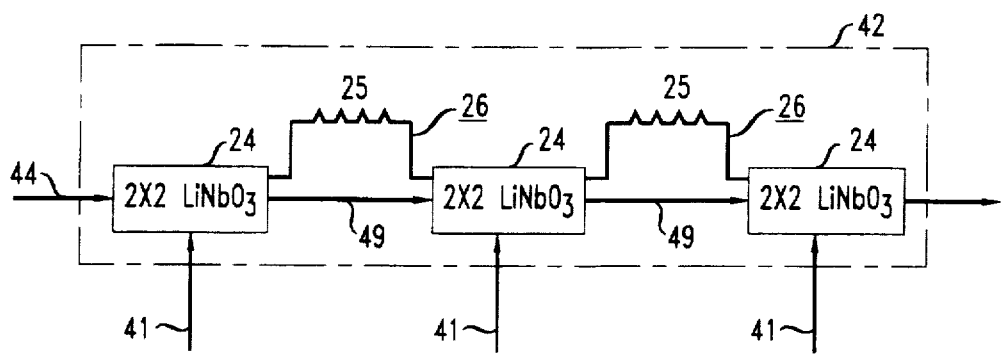

An alternative apparatus to be used in the synchronizer 42 is shown in FIG. 7. Three 2×2 Lithium Niobate modules 24 are connected in tandem with a delay element 25 located between the end modules 24 and the center module 24. There is also a direct connection 49 between the switches 24. Each delay element 25 also provides a delay equal to the time duration of one packet 20. As can be readily determined this configuration can also provide a delay of $n\tau$ where n=0, 1, or 2 under the control of the synchronization circuitry 38.

In operation (see FIGS. 2 and 3), a stream of packets 20, each having a time duration $\tau$ which is equal to or less than half the length of the local time slot, is received by the synchronizer 17 on input 21. The splitter 18 causes a small fraction of the received optical signal to be optically forwarded to the detector 19. The detector 19 outputs electrical signals representative of packet 20 to the synchronization circuitry 38 and the control 22. The synchronization circuitry 38 examines the input signal and the signal from the local clock 28 to determine the appropriate delay, if any, required to ensure the one packet per frame s-characteristic. A control signal from the synchronization circuitry 38 is then sent to the synchronizer 42, as shown in FIG. 6 or 7, to route the packet 20 through the appropriate number of delay elements 25 to provide delay of $n\tau$ where n=0, 1, or 2 to the packets 20. The s-characteristic packets 20 are then forwarded to the scheduling and switching stages 12 and 14, respectively, and directed to the appropriate outputs 23 under the direction of control apparatus 22.

FIG. 5a shows a train of packets 20 at the input of the first optical packet switch 6d. The vertical dotted lines depict clock pulses 52 which define the frames 29 at the first switch 6d. It can be seen that the s-characteristic has been violated on four occasions. Accordingly, the train of packets 20 is passed through the delay synchronizer 17, and each of the packets which violate the s-characteristic is delayed τ resulting in the train of packets 20, shown in FIG. 5b, at the output of the synchronizer 17, of the first switch 6d. As can be seen in FIG. 5a four packets 20 are delayed an interval of τ, while four packets receive no delay in order to attain s-synchronization of FIG. 5b.

To carry this example one step further, FIG. 5c depicts a train of packets 20, at the output of the first switch 6d (see FIG. 1) which are to be inputs to the second switch 6e and a set of local clock pulses 54 which define the frames 28 of the second switch 6e. Again there are several violations of the s-characteristic. Therefore, the train of packets 20 of FIG. 5c are passed through the delay synchronizer 17, of the second switch 6e to flip (i.e. delay) the packets into the appropriate frame 29 so as to present the acceptable train of packets (see FIG. 5d) to the second switch 6e. It should be noted that the packets 20, need only be flipped once, twice or not at all in order to adjust any sequence of received packets 20, to conform with the s-characteristic requirement.

Figure 8:
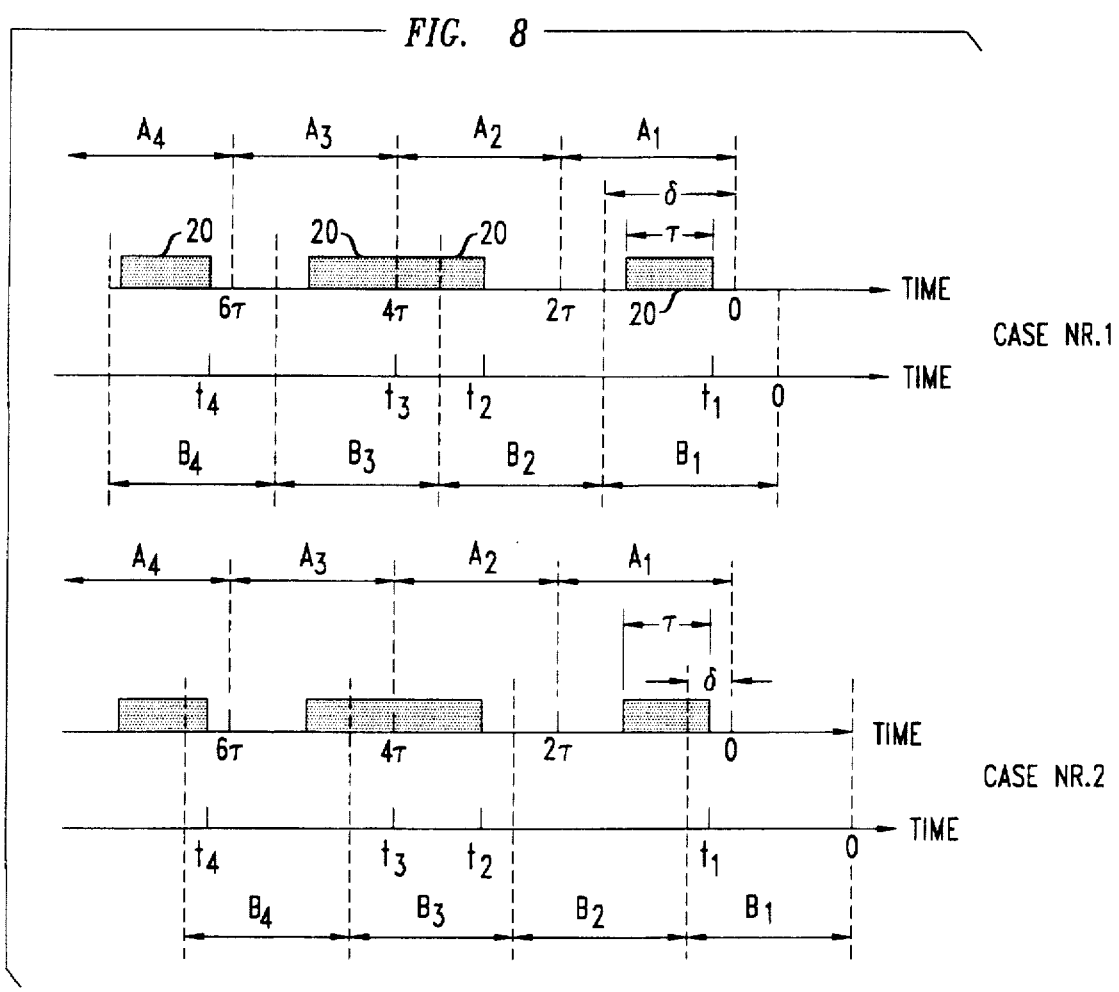
FIG. 8 is a time diagram for proving the packet-delaying algorithm.

In order to show that an nτ delay, where n=0,1, or 2, can restore the s-characteristic using using the instant technique, consider the time diagram of FIG. 8. This figure shows a transmission of four packets 20, with two (unsynchronized) clocks A and B. The traffic has the s-characteristic with respect to the frames of clock A (i.e. $A_1, A_2, A_3$, and $A_4$), but not with respect to clock B. For clock A, time is measured on axis t while for clock B, time is measured on axis t'. The packet 20 traffic must be converted so that it exhibits the s-characteristic with respect to clock B.

The offset of clock B from clock A is designated by δ; i.e., $t_A - t_B = \delta$, where $t_A$ and $t_B$ are the clock instances of clock A and B, respectively. Assume case 1, where $\tau \leq \delta \leq 2\tau$.

In this case, we use one of the delay lines of delay τ to offset the transmission, so that we can now assume that $0 \leq \delta \leq \tau$, as in the case nr. 2. What remains to be shown is that in the case when $0 \leq \delta \leq \tau$, using a single delay line of delay τ restores the s-characteristics of the traffic with respect to clock B (the case nr. 2).

To prove the above, each frame of clock A is associated with a frame of clock B, as shown in FIG. 8 (i.e., $A_1$ is associated with B1, etc. ) . Now, the claim is that under the above conditions, a packet either fits in a frame of clock B, or can be delayed by τ and now fit in the frame.

If a packet 20 fits in the clock B frame, nothing needs to be done. This will happen when $\delta \leq t_i \leq 2\tau$, where $t_i$ is the arrival time of packet i. On the other hand, if a packet 20 'falls' on the B clock (i. e., when $0 \leq t_i \leq \delta \leq \tau$, the packet needs to be delayed by τ. When this happens, the time of arrival of the packet i on the t' axis will be: $t'_i = t_i - \delta + \tau$. But since $0 \leq t_i \leq \delta \leq \tau$, it follows that $0 \leq t - \delta \leq t'_i \leq \tau$. Thus, after the delay, the packet 20 will fit into the clock B frame.

Since the synchronously operating switch 6 with frames of size 2τ will preserve the s-charcteristic of the traffic with respect to the local clock, and since the input traffic to the first switch in a series of switches is s-characteristic, by using delay synchronizers 17 at the input portion of every switch 6, the traffic presented to every one of the switches 6 can be made s-characteristic with respect to every local clock.

Figure 9:
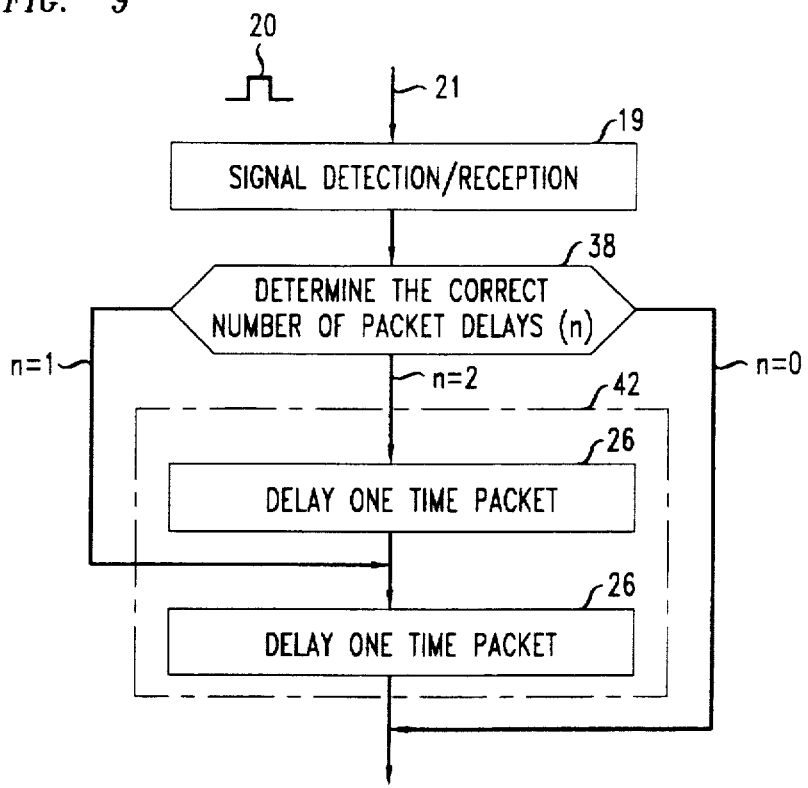
FIG. 9 shows the basic flow for synchronizing the arrival times of the information packets according to the present invention.

FIG. 9 shows the basic flow for synchronizing the arrival times of information packets 20. These information packets 20 are detected on the input line 21 and received into the overall circuit. The output 44 is passed to the synchronization circuitry 38 to determine if any "packet flipping" is needed. If the packet needs to be delayed once, it will go into the synchronizer 42, through one delay circuit 26. If the synchronization circuitry 38 determines that two delays are required, the packet 20 will go into the synchronizer 42, through two delay circuits 26. Otherwise, the packet 20 will bypass the synchronizer 42, causing no delays.

Figure 10:
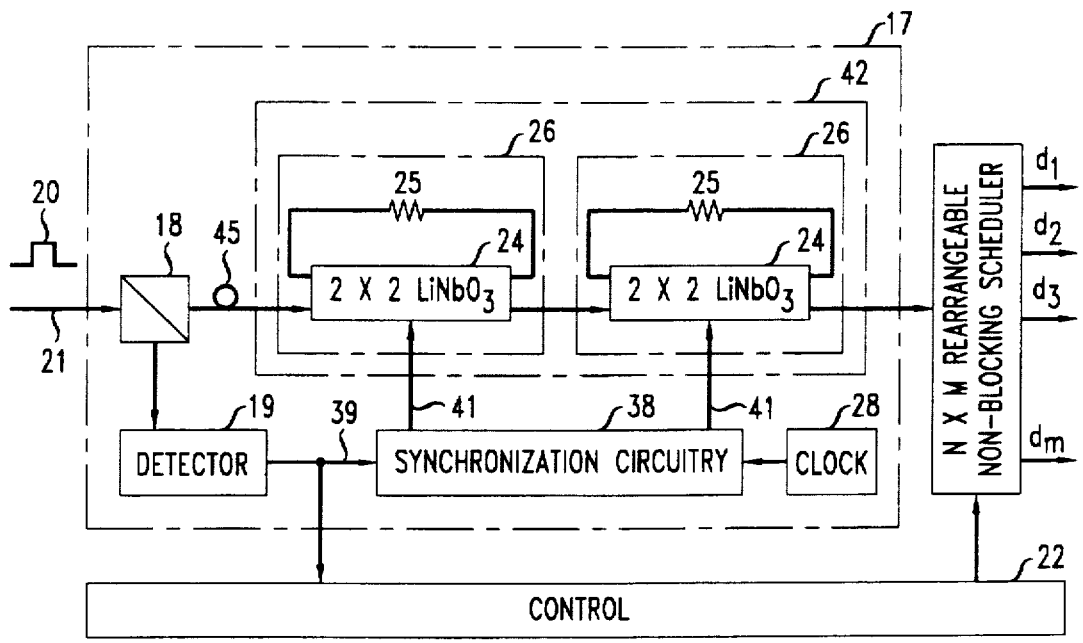
FIG. 10 shows an overall block diagram for the present invention using two delay circuits.

The overall block diagram of the present invention is depicted in FIG. 10. The stream of packets 20 is brought in on the input lines 21 and received by the splitter 18 at the input of the delay synchronizer 17. A small fraction of the optical energy, as first output 36, is passed to the detector 19 and converted to an electrical signal 39 to inform the control 22 and synchronization circuit 38 of the arriving packet 20. A small optical delay 45 is used to compensate for the delay of the optic energy passing through the detector 19 and synchronization circuitry 38. The synchronization circuitry 38 then determines whether any packet delays are required to adjust the input packet stream 20 by comparing it to the local clock 28. The time duration of the local clock 28 is at least twice the length of a receiving packet 20.

Based on that determination, the synchronization circuitry 38 will control the number of delays of the optical packet 20 as it goes through the synchronizer 42. If no delay is needed to adjust the input packet stream 20 to have a single packet per local time slot (based on the local clock 28), the synchronization circuitry 38 will direct the stream of received packets 20 directly through both 2×2 Lithium Niobate optical modules 24 of the two delay circuits 26 without adding any delay.

If one delay is determined to be needed, the synchronization circuitry 38 will send the packets 20 through the first delay element 25. This will ensure that the packet 20 that was selected to be delayed, in conjunction with those that needed no delay, will form a packet stream having one packet per local time slot.

If two delays are determined to be needed, the synchronization circuitry 38 will send the packet 20 through both delay elements 25 along with being routed through the 2×2 Lithium Niobate optical modules 24. This packet stream will then enter the N×M rearrangable non-blocking scheduler 12 for proper switching through the network.

It should be understood that the above described techniques are merely illustrative of the many possible specific embodiments which represent applications of the present invention. Numerous and varied other arrangements can readily be devised in accordance with the principals of the present inventions without departing from the spirit and scope thereof. For example, the illustrative embodiment describes the invention as it relates to synchronously operated optical packet switch. However, the instant technique can also be used to synchronize time slots in any all-optical time-division multiplexed networks.

What is claimed is:

1. A method for synchronizing the arrival times of information packets at synchronously operated nodes in an optical time division multiplexed network, comprising the steps of:

receiving a stream of information packets at the node, each packet having a time duration τ, which is equal to or less than one-half the duration of the local time slot of the node;

determining any packet delays required to adjust the input packet stream to have a single packet per the local time slot; and delaying selected packets to form a packet stream having one packet per local time slot of the node, based upon the delays established by the determining step.

2. The method as set forth in claim 1 wherein the delaying step is characterized by:

delaying each packet a time duration of $n\tau$ where $n=0$, 1 or 2 based upon the results of the determining step.

3. A method for synchronizing packet arrival times at the input of a synchronously operated optical packet switch, comprising the steps of:

receiving packets, each having a length $\tau$, which are equal to or less than one-half the time duration of the local time slot of the optical packet switch;

determining any packet delays required to adjust the input packet stream to have a single packet per local time slot; and directing the stream of received packets through a delay apparatus to delay each packet $n\tau$ where $n=0$, 1 or 2, to form a packet stream having one packet per local time slot of the switch node, based upon the delays established by the determining step.

4. An apparatus for synchronizing the arrival times of information packets at synchronously operated nodes in an optical time division multiplexed network, comprising:

means for receiving a stream of information packets, each packet having a time duration $\tau$, which is equal to or less than one-half the length of the local time slot of the node;

means for determining any packet delays required to adjust the input packet stream to have a single packet per the local time slot; and means for delaying selected packets to form a packet stream having one packet per local time slot, based upon the delays established by the determining means.

5. The apparatus as set forth in claim 4, wherein the delaying means comprises:

apparatus to delay each packet a time duration of $n\tau$, where $n=0$, 1 or 2.

6. The apparatus as set forth in claim 5 in which the delay apparatus comprises:

two serially connected 2×2 modules, each having a delay element of $\tau$ in duration, associated therewith, adapted to provide a delay of 0, $\tau$ or $2\tau$.

7. The apparatus as set forth in claim 6 in which each module is comprised of:

a 2×2 Lithium Niobate switch.

8. The apparatus as set forth in claim 5 in which the delay apparatus comprises:

three 2×2 modules, serially connected, with a delay element therebetween to provide delay of 0, $\tau$ or $2\tau$.

9. The apparatus as set forth in claim 8 in which each module is comprised of:

a 2×2 Lithium Niobate switch.

* * * * *